UNITED STATES PATENT OFFICE.

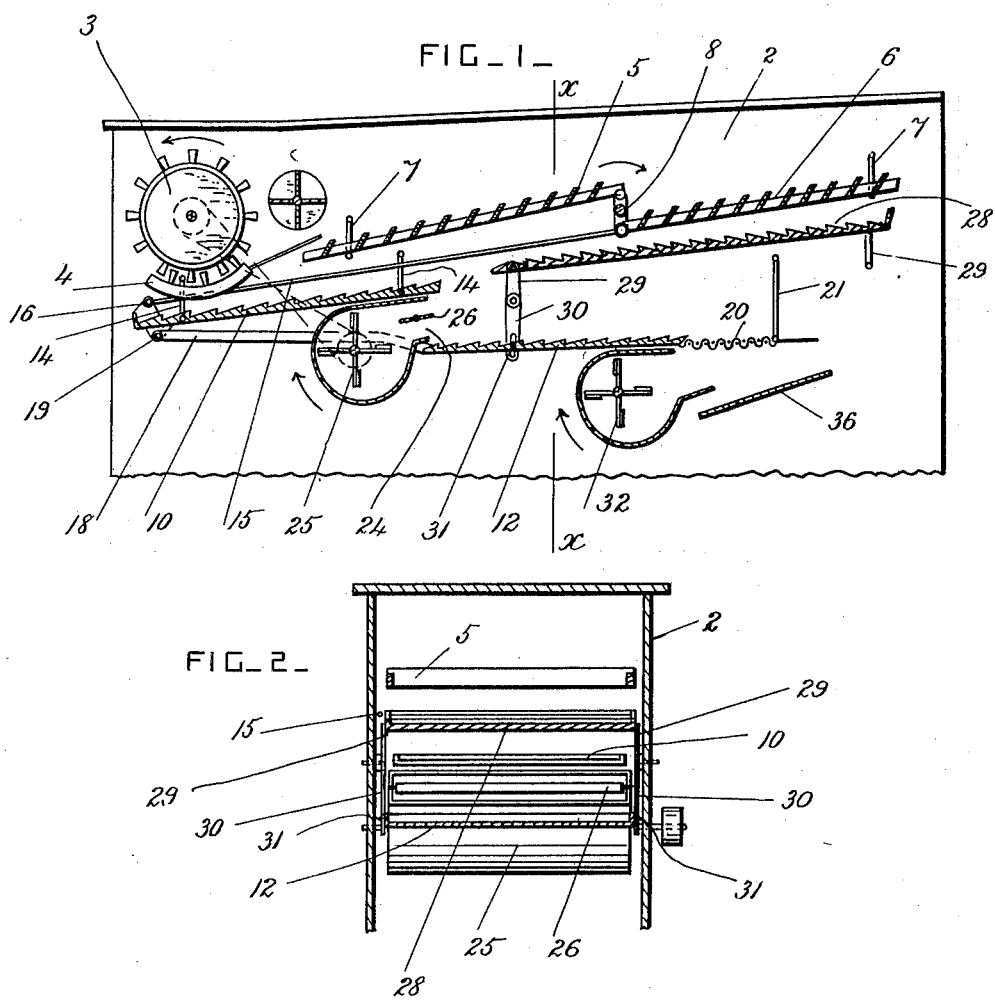

CHARLES SEAGREN, OF HOLDREGE, NEBRASKA.

GRAIN-SEPARATOR.

1,112,848.  Specification of Letters Patent.  Patented Oct. 6, 1914.

Application filed January 7, 1914. Serial No. 810,850.

*To all whom it may concern:*

Be it known that I, CHARLES SEAGREN, a citizen of the United States, residing at Holdrege, in the county of Harlan and State of Nebraska, have invented certain new and useful Improvements in Grain-Separators; and I do hereby declare the following to be a full, clear, and exact description of the invention, such as will enable others skilled in the art to which it appertains to make and use the same.

This invention relates to separators for grain provided with shaking straw racks and grain bottoms; and it consists in improved means for separating the chaff from the grain as hereinafter fully described and claimed.

In the drawings, Figure 1 is a longitudinal section through portions of a grain separator provided with improvements according to this invention. Fig. 2 is a cross-section, taken on the line x—x in Fig. 1.

The casing 2 of the separator has a threshing cylinder 3 and a concave 4 arranged inside its inlet end portion; and a front straw rack 5 and a rear straw rack 6 are arranged in the middle and rear end portions of the casing, and are supported by pivoted links 7. The straw racks are reciprocated by means of a crankshaft 8 which is journaled between them; and all the above mentioned parts are of any approved construction.

A front grain bottom 10 and a rear grain bottom 12 are provided. The front grain bottom is arranged under the concave and the front end portion of the front straw rack 5, and it is arranged in an upwardly and rearwardly inclined position, so as to catch the grain which is driven off from the threshing cylinder.

The front grain bottom 10 is hung upon two pairs of similar links 14 of substantially equal length, so that it may oscillate freely; and it has a shaking and tossing motion imparted to it by means of a connecting-rod 15 which is pivoted to it by a pin 16 at one end and to one of the cranks of the crankshaft 8 at the other end. The rear grain bottom 12 is arranged under the adjacent end portions of the front and rear straw racks, and in a position inclined upwardly and rearwardly to a slight extent only, so that it is substantially horizontal. The rear grain bottom 12 has two long side arms 18 which are pivoted by pins 19 to the front end portion of the front grain bottom, so that a shaking motion is imparted to the rear grain bottom. The surfaces of both grain bottoms are preferably serrated so that the grain is caused to move rearwardly over them, and the rear grain bottom has a chaffing sieve or screen 20 at its rear end. The rear end portion of the rear grain bottom 12 is pivoted to the casing by two similar links 21 which are considerably longer than the links 14 so that the rear part of the rear grain bottom has comparatively little tossing motion in proportion to its longitudinal or shaking movement. A space or passage 24 is provided between the adjacent ends of the two grain bottoms, and 25 is a front fan which delivers a current of air against the material which falls from the rear end of the front grain bottom onto the front end portions of the rear grain bottom. A regulating board 26 is pivoted in the delivery passage of the fan 25 to vary the angle of the blast and its strength.

A return bottom 28 is arranged under the rear straw rack and the rear end portion of the front straw rack. This return bottom is inclined downwardly and forwardly, and its front end is arranged adjacent to and a little above the level of the blast passage 24 of the front fan 25. The return bottom 28 is pivoted to the casing by two pairs of similar links 29, so that it oscillates independently of the straw racks, and has a more gentle motion imparted to it. One pair of links 29 has extension arms 30 which are operatively connected with the rear grain bottom 12 by pins 31, and the return bottom is shaken in the opposite direction from the rear grain bottom.

A rear fan 32 is arranged under the rear grain bottom, and it delivers a blast of air through the chaffer screen or sieve 20. The curved arrows in the drawing show the direction of motion of the various revoluble parts, and any approved driving mechanism is provided for revolving them.

Much of the chaff is blown out of the grain by the front fan, and a considerable portion of the chaff is carried out at the rear end of the machine without falling on the rear grain bottom. The grain and other material which falls from the two straw racks onto the return bottom is also winnowed by the front fan to some extent, and the partially winnowed grain then passes rearwardly over the rear grain bottom. The complete removal of the chaff from the grain is effected by the rear fan, and the completely winnowed grain falls onto a suitable gatherboard 36 from the rear end of the chaffing screen. When a separator is constructed as hereinbefore described, its manufacture is simplified and rendered less expensive, and it is found to effect a very satisfactory separation of the chaff from the grain.

What I claim is:

1. In a grain separator, the combination, with front and rear straw racks, of imperforate front and rear grain bottoms pivotally connected together and pivotally supported under the said racks, a chaffing screen secured to the rear end of the rear grain bottom, a return bottom extending under the rear straw rack and under the rear part of the front straw rack and delivering the material which falls on it onto the imperforate front end portion of the rear grain bottom, and means for delivering an air blast between the two bottoms and through the chaffing screen.

2. In a grain separator, the combination, with front and rear straw racks, of a front grain bottom, an imperforate rear grain bottom arranged behind the front grain bottom and provided with arms which project forwardly from its sides and have their front end portions pivoted to the front end portion of the front grain bottom, means for supporting and oscillating the said grain bottoms, a chaffing screen secured to the rear end of the rear grain bottom, a return bottom extending under the rear straw rack and under the rear part of the front straw rack and delivering the material which falls on it onto the imperforate front end portion of the rear grain bottom, and means for delivering an air blast between the two grain bottoms and through the chaffing screen.

3. In a grain separator, the combination, with front and rear straw racks, and a crankshaft operatively connected with the adjacent end portions of the straw racks; of front and rear grain bottoms pivotally connected together and pivotally supported under the said racks; a connecting-rod arranged between the said crankshaft and the front end portion of the front grain bottom, a chaffing screen secured to the rear end of the rear grain bottom, a shaking return bottom extending under the rear straw rack and under the rear part of the front straw rack and delivering the material which falls on it onto the imperforate front end portion of the rear grain bottom, a driving connection between the rear grain bottom and the return bottom above it, and means for delivering an air blast between the two grain bottoms and through the chaffing screen.

In testimony whereof I have affixed my signature in the presence of two witnesses.

CHARLES SEAGREN.

Witnesses:
 ALBERT ANDERSON,
 CLAUDE H. BLACK.